(12) United States Patent
Khawer et al.

(10) Patent No.: US 8,634,302 B2
(45) Date of Patent: *Jan. 21, 2014

(54) APPARATUS FOR MULTI-CELL SUPPORT IN A NETWORK

(75) Inventors: Mohammad R. Khawer, Lake Hopatcong, NJ (US); Shriram K. Easwaran, Randolph, NJ (US)

(73) Assignee: Alcatel Lucent, Paris (FR)

( * ) Notice: Subject to any disclaimer, the term of this patent is extended or adjusted under 35 U.S.C. 154(b) by 183 days.

This patent is subject to a terminal disclaimer.

(21) Appl. No.: 12/847,414

(22) Filed: Jul. 30, 2010

(65) Prior Publication Data

US 2012/0028636 A1 Feb. 2, 2012

(51) Int. Cl.
*H04L 12/28* (2006.01)
*H04L 12/40* (2006.01)
*H04L 12/66* (2006.01)
*G06F 15/167* (2006.01)
*G06F 15/76* (2006.01)

(52) U.S. Cl.
USPC ........... 370/238; 370/400; 370/438; 370/463; 709/212; 712/32

(58) Field of Classification Search
USPC ................. 370/229–240, 328–329, 338, 341, 370/400–401, 437–439, 463, 468, 477; 709/212–215, 248; 712/28, 32, 42–43, 712/203
See application file for complete search history.

(56) References Cited

U.S. PATENT DOCUMENTS

| | | | |
|---|---|---|---|
| 5,408,464 A | 4/1995 | Jurkevich | |
| 5,913,230 A | 6/1999 | Richardson | |
| 6,115,748 A | 9/2000 | Hauser et al. | |
| 6,735,620 B1 | 5/2004 | Blackmore et al. | |
| 6,799,200 B1 | 9/2004 | Blackmore et al. | |
| 6,999,432 B2 | 2/2006 | Zhang et al. | |
| 7,003,042 B2 | 2/2006 | Morelos-Zaragoza et al. | |
| 7,089,289 B1 | 8/2006 | Blackmore et al. | |
| 7,093,013 B1 | 8/2006 | Hornok, Jr. et al. | |

(Continued)

FOREIGN PATENT DOCUMENTS

| | | |
|---|---|---|
| EP | 1 788 491 | 5/2007 |
| WO | WO 01/63416 | 8/2001 |

(Continued)

OTHER PUBLICATIONS

International Search Report dated Dec. 2, 2011.

(Continued)

*Primary Examiner* — Tri H Phan
(74) *Attorney, Agent, or Firm* — Fay Sharpe, LLP

(57) ABSTRACT

An apparatus for providing multi-cell support in a telecommunications network is described. The apparatus includes a modem board and a multi-core processor having a plurality of processor cores attached to the modem board. A single partition is defined with all of the processor cores included in it. The single partition is used to execute all control plane functions and all data plane functions. Typically, the multi-core processor is configured to include a core abstraction layer that hides any core specific details from application software running on the processor cores in the single partition and to serve at least three cells in the telecommunications network, each cell having a corresponding uplink scheduler and a corresponding downlink scheduler. In this configuration there is no need to use a hypervisor, since there is only one OS instance running (a potential cost saving).

17 Claims, 3 Drawing Sheets

(56) References Cited

U.S. PATENT DOCUMENTS

| | | |
|---|---|---|
| 7,096,034 B2 | 8/2006 | Zhang et al. |
| 7,180,866 B1 | 2/2007 | Chartre et al. |
| 7,206,966 B2 | 4/2007 | Barr et al. |
| 7,352,693 B2 | 4/2008 | Seid et al. |
| 7,451,456 B2 | 11/2008 | Andjelic |
| 7,571,440 B2 | 8/2009 | Vessey et al. |
| 7,590,050 B2 | 9/2009 | Foltak |
| 7,603,256 B2 | 10/2009 | Cheng et al. |
| 7,609,652 B2 | 10/2009 | Kellerer et al. |
| 7,620,753 B1 | 11/2009 | Beaman et al. |
| 7,656,815 B2 | 2/2010 | Kellerer et al. |
| 7,668,191 B2 | 2/2010 | Steinback et al. |
| 7,831,710 B2 | 11/2010 | Ing et al. |
| 7,873,964 B2 | 1/2011 | Huang et al. |
| 7,933,197 B2 | 4/2011 | Bryant et al. |
| 7,953,915 B2 * | 5/2011 | Ge et al. ............... 710/266 |
| 8,024,417 B2 | 9/2011 | Mehrotra |
| 8,059,532 B2 * | 11/2011 | Riddle et al. ............ 370/230 |
| 8,072,879 B2 | 12/2011 | Vasseur et al. |
| 8,099,546 B2 | 1/2012 | Rostedt |
| 8,271,996 B1 | 9/2012 | Gould et al. |
| 8,504,744 B2 * | 8/2013 | Khawer et al. ............ 710/56 |
| 2002/0087710 A1 | 7/2002 | Aiken et al. |
| 2003/0188233 A1 | 10/2003 | Lubbers et al. |
| 2004/0062246 A1 | 4/2004 | Boucher et al. |
| 2004/0081080 A1 | 4/2004 | Ji et al. |
| 2004/0187117 A1 | 9/2004 | Orion et al. |
| 2005/0008011 A1 | 1/2005 | Georgiou et al. |
| 2005/0111389 A1 | 5/2005 | Dick et al. |
| 2006/0003792 A1 | 1/2006 | Gholmieh et al. |
| 2006/0041737 A1 | 2/2006 | Kumagai |
| 2006/0046819 A1 * | 3/2006 | Nguyen et al. ............ 463/16 |
| 2007/0010281 A1 | 1/2007 | Sebire |
| 2007/0104204 A1 | 5/2007 | Brokenshire et al. |
| 2007/0195723 A1 | 8/2007 | Attar et al. |
| 2007/0220294 A1 | 9/2007 | Lippett |
| 2008/0002681 A1 * | 1/2008 | Bajic et al. ............. 370/389 |
| 2008/0002702 A1 * | 1/2008 | Bajic et al. ............. 370/392 |
| 2008/0107014 A1 | 5/2008 | Huang et al. |
| 2008/0276056 A1 | 11/2008 | Giacomoni et al. |
| 2009/0055826 A1 | 2/2009 | Bernstein et al. |
| 2009/0080369 A1 | 3/2009 | Uminski et al. |
| 2009/0097397 A1 | 4/2009 | Moreira Sa de Souza |
| 2009/0122756 A1 | 5/2009 | Gu et al. |
| 2009/0207726 A1 | 8/2009 | Thomson et al. |
| 2009/0228890 A1 | 9/2009 | Vaitovirta et al. |
| 2009/0248934 A1 | 10/2009 | Ge et al. |
| 2010/0008218 A1 | 1/2010 | Dumov et al. |
| 2010/0029266 A1 | 2/2010 | van Gassel et al. |
| 2010/0080116 A1 | 4/2010 | Agashe et al. |
| 2010/0121975 A1 * | 5/2010 | Sinha et al. ............. 709/231 |
| 2010/0157814 A1 | 6/2010 | Ha et al. |
| 2010/0184432 A1 | 7/2010 | Yano et al. |
| 2010/0278038 A1 | 11/2010 | Stahle et al. |
| 2010/0295859 A1 | 11/2010 | Stauffer et al. |
| 2010/0296428 A1 | 11/2010 | Ho |
| 2010/0315561 A1 | 12/2010 | Cooper et al. |
| 2010/0318996 A1 | 12/2010 | Harris et al. |
| 2010/0322067 A1 | 12/2010 | Tenny |
| 2010/0322250 A1 | 12/2010 | Shetty et al. |
| 2010/0331056 A1 | 12/2010 | Nasrabadi et al. |
| 2011/0044165 A1 | 2/2011 | Ni et al. |
| 2011/0069650 A1 | 3/2011 | Singh et al. |
| 2011/0093733 A1 | 4/2011 | Kruglick |
| 2011/0122884 A1 | 5/2011 | Tsirkin |
| 2011/0138387 A1 | 6/2011 | Ahn et al. |
| 2011/0292824 A1 | 12/2011 | Uemura et al. |
| 2012/0069728 A1 | 3/2012 | Jung et al. |
| 2012/0079290 A1 | 3/2012 | Kumar et al. |
| 2012/0093047 A1 * | 4/2012 | Khawer et al. ............ 370/310 |
| 2012/0110223 A1 | 5/2012 | Khawer et al. |
| 2012/0120965 A1 | 5/2012 | Khawer et al. |
| 2012/0131376 A1 * | 5/2012 | Khawer et al. ............ 714/4.11 |
| 2012/0134320 A1 * | 5/2012 | Khawer et al. ............ 370/328 |
| 2012/0155398 A1 | 6/2012 | Oyman et al. |
| 2012/0207011 A1 | 8/2012 | Franklin et al. |
| 2013/0017854 A1 | 1/2013 | Khawer |
| 2013/0061231 A1 * | 3/2013 | Zhang et al. ............. 718/102 |
| 2013/0117305 A1 * | 5/2013 | Varakin et al. ............ 707/769 |

FOREIGN PATENT DOCUMENTS

| | | |
|---|---|---|
| WO | WO 02/07464 | 1/2002 |
| WO | WO 2005/098623 | 10/2005 |
| WO | WO 2008/005793 | 1/2008 |

OTHER PUBLICATIONS

"Emerson Network Power: AMC-9210 AdvancedMC Module Preliminary Data Sheet", http://www.powerbridge.de, Jun. 1, 2008, pp. 1-3.

Freescale Semiconductor; QorIQ™ P4080 Communications Processor Product Brief; Sep. 2008; Freescale Semiconductor, Inc.; Rev. 1; pp. 2-5, 14-15, 19-22, 28-29.

RapidIO Trade Association; RapidIO™ Interconnect Specification; Jun. 2002; RapidIO™ Trade Association; Rev. 1.2; p. II-10.

Siu, Sam, "An Introduction to the QorIQ™ Data Path Acceleration Architecture (DPAA)"; Jun. 23, 2010; Freescale Semiconductor, Inc; FTF-NET-F0444; pp. 1-21.

Wang, Shrek; An Introduction to the QorIQ™ Data Path Acceleration Architecture (DPAA); Aug. 2009; Freescale Technology Forum; 1-12.

Palaniappan, Sathish K., et al., "Efficient data transfer through zero copy", IBM Corporation, Sep. 2008.

International Search Report dated Oct. 24, 2012.

Freescale Semiconductor; QorIQ™ P4080 Communications Processor Product Brief; Sep. 2008; Freescale Semiconductor, P4080PB; Rev. 1, p. 1-33.

US 6,014,703, 01/2000, McCrory et al. (withdrawn)

* cited by examiner

APPARATUS FOR MULTI-CELL SUPPORT IN A NETWORK

BACKGROUND OF THE INVENTION

This invention relates to an apparatus for multi-cell support on a single modem board using a multi-core processor and a single partition symmetric multiprocessing (SMP) configuration. While the invention is particularly directed to the art of mobile telecommunications, and will be thus described with specific reference thereto, it will be appreciated that the invention may have usefulness in other fields and applications.

By way of background, LTE (Long Term Evolution) is a rapidly evolving 3GPP project that aims to improve the UMTS (Universal Mobile Telecommunications System) mobile phone standard to cope with future communication network demands. LTE improves wireless network efficiency/bandwidth, lower costs and enhance services experience. Specifically, LTE makes use of new spectrum opportunities and offer better integration with other open standards. LTE is composed of the LTE RAN (Radio Access Network) (also known as E-UTRAN) along with the EPS (Evolved Packet System, also called Evolved Packet Core).

Communication systems are generally split into two primary functions: data plane and control plane. In previous LTE products, at least two processors were used on the modem board: one to support the control plane functions (non-real time, e.g., Operations, Administration, and Management (or OA&M), and call processing management-related functionalities), and the other to terminate and support the data plane functions (real time, e.g., LTE Layer 2 processing). Both the control and data planes used different operating system (OS) instances, for example, Linux for the control plane and a hard real-time OS such as vXWorks (made and sold by Wind River Systems of Alameda, Calif.) for the data plane core. Typically, one modem board supports one sector or cell. So to support multi-cell (e.g., 3-cells or 6-cells) configurations, it is necessary to provide as many modem boards as the number of cells.

The present invention contemplates a new and improved apparatus that resolves the above-referenced difficulties and others.

SUMMARY OF THE INVENTION

With the next generation of LTE modem boards a processor with 8 cores is being used. This will allow the system to support a multi-cell configuration (i.e., support for up to 6 cells) using a single modem board. This will also obviate the need to use two separate processors on the modem board to support the control and data planes. This results in a significant reduction in the number of devices on the board. In addition, it will not be necessary to have separate DDR memory devices for the two processors, among other things. This new design approach will reduce cost because fewer modem boards will need to be plugged into the base station to support a multi-cell configuration. Another advantage of this solution is the reduction in the base station real estate footprint and less overall power consumption for the base station with the use of one modem board as opposed to up to six.

In one embodiment of the present invention, an apparatus for providing multi-cell support in a telecommunications network is provided. The apparatus includes a modem board and a multi-core processor having a plurality of processor cores attached to the modem board. At least one processor core is used to execute all control plane functions and the remaining processor cores are used to execute all data plane functions. Optionally, the multi-core processor may be configured to include a core abstraction layer that hides any core specific details from application software running on the processor cores. Additionally, the multi-core processor may be configured to include a supervisor software entity for fault isolation. In addition, the multi-core processor may be configured to serve at least three cells in the telecommunications network, each cell having a corresponding uplink scheduler and a corresponding downlink scheduler. The multi-core processor may have eight cores, and the first processor core may run a first operating system and the remaining processor cores may run individual instances of a second operating system.

In another embodiment of the present invention, an apparatus for providing multi-cell support in a telecommunications network is provided. The apparatus includes a modem board and a multi-core processor having a plurality of processor cores attached to the modem board. A single partition is defined with all of the processor cores included in it. The single partition is used to execute all control plane functions and all data plane functions. Optionally, the multi-core processor may be configured to include a core abstraction layer that hides any core specific details from application software running on the processor cores in the single partition. Further, the multi-core processor may be configured to serve at least three cells in the telecommunications network, each cell having a corresponding uplink scheduler and a corresponding downlink scheduler. The multi-core processor may comprise eight processor cores, and a single operating system instance may run on all of the cores. The single operating system instance may comprise SMP Linux with PREEEMPT_RT.

In yet another embodiment of the invention, an apparatus for providing multi-cell support with core affinity and core reservation in a telecommunications network is provided. The apparatus includes a modem board and a multi-core processor having a plurality of processor cores attached to the modem board and configured so that all non-real-time threads and processes are bound to processor cores that are dedicated for all control plane activities. Processor cores that are dedicated for all data plane activities will not host or run any threads that are not directly needed for data path implementation or Layer 2 processing. Optionally, the multi-core processor may be configured to include a default affinity mask to control plane cores or a core abstraction layer that hides any core specific details from application software running on the processor ores. A single operating system instance may run on all of the cores.

Further scope of the applicability of the present invention will become apparent from the detailed description provided below. It should be understood, however, that the detailed description and specific examples, while indicating preferred embodiments of the invention, are given by way of illustration only, since various changes and modifications will become apparent to those skilled in the art without departing from the range of equivalents.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION

Figure 1:
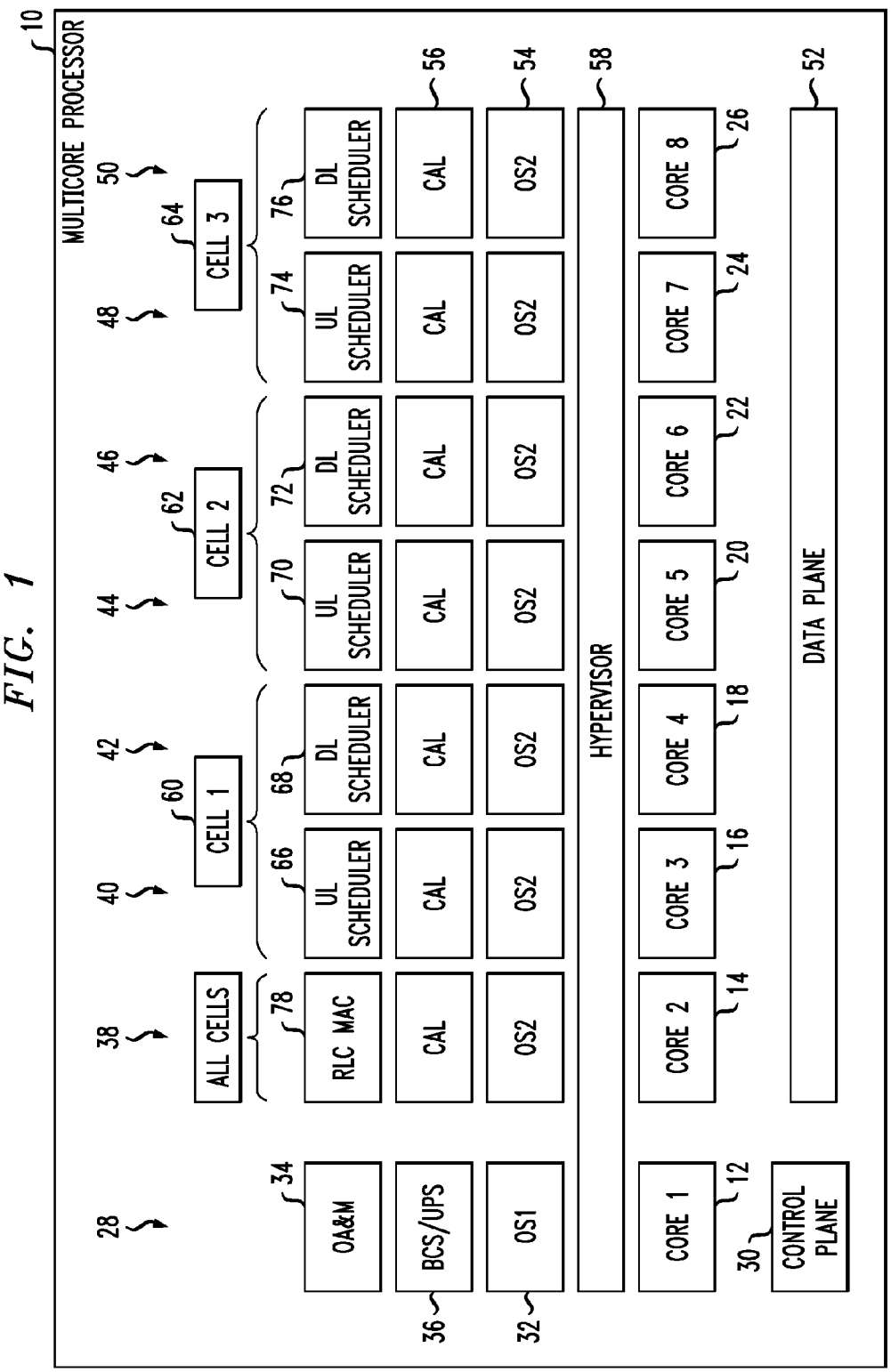
FIG. 1 illustrates one embodiment of a platform software architecture in accordance with aspects of the present invention.

Referring now to the drawings wherein the showings are for purposes of illustrating the exemplary embodiments only and not for purposes of limiting the claimed subject matter, FIG. 1 provides a view of an exemplary system into which the presently described embodiments may be incorporated.

Figure 2:
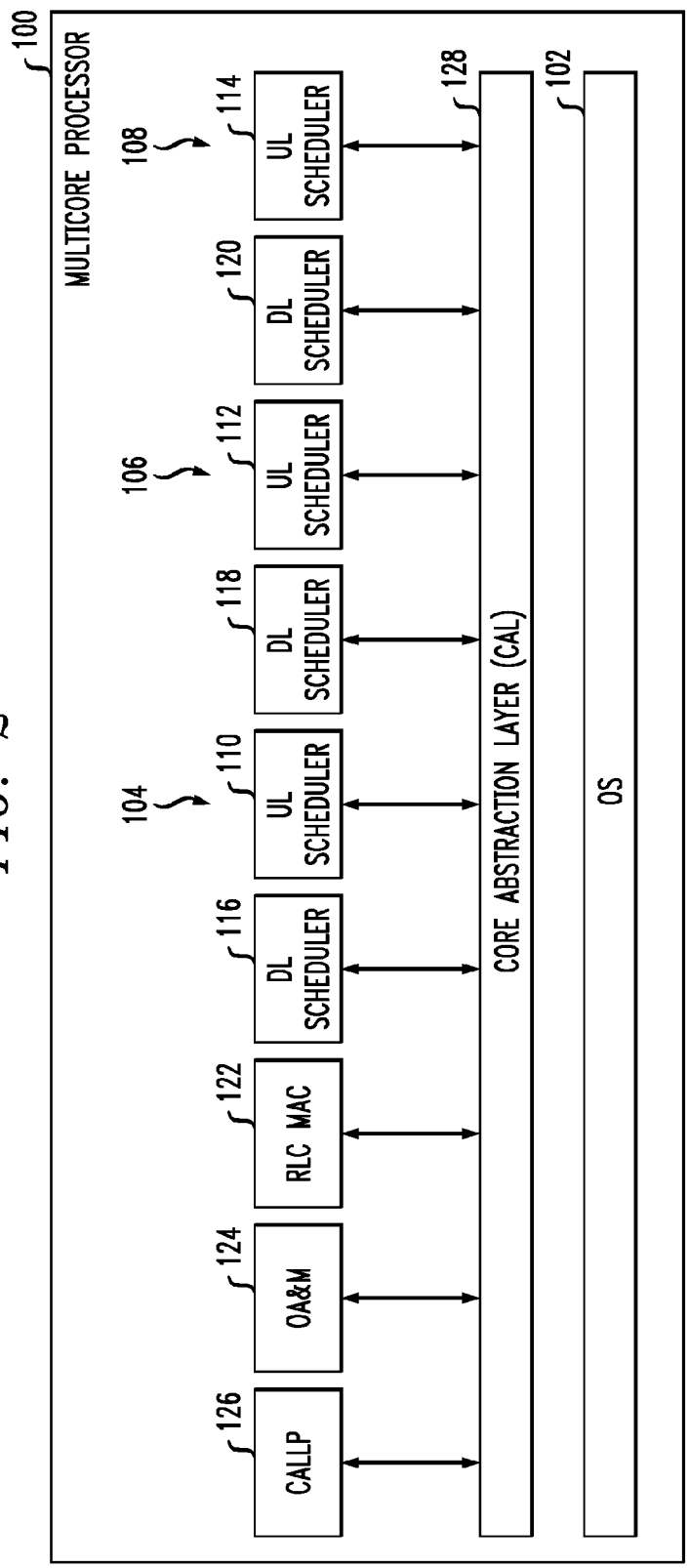
FIG. 2 illustrates another embodiment of a platform software architecture in accordance with aspects of the present invention.

Scalability is a major design consideration for this multi-cell software architecture. Therefore, a configuration that can be easily scaled up or down without major software reconfiguration is needed. With multi-core processors, there are at least two choices of system configurations: a Supervised Asynchronous Multiprocessing (AMP) Configuration (FIG. 1) and an SMP Configuration (FIG. 2). These system configurations will be described in greater detail below.

Supervised Asynchronous Multiprocessing (AMP) Configuration.

In the first embodiment, a partition containing at least one core to support the control plane functionality is defined, and as many partitions containing one or more cores for the data plane as the number of cells that are to be supported are defined. In this configuration, it is generally necessary to provide as many instances of the operating system (OS) as the number of partitions. In this configuration, there is a need to use another software entity called a hypervisor for proper system operation. The hypervisor ensures that one OS instance will not corrupt other partitions. However, the use of a hypervisor adds significantly to the cost, because it is typical for the OS vendor to demand a licensing fee for each instance of use. The use of at least two different types of OS (one for the control plane and the other for the data plane) makes maintainability, as well as cost, a factor of concern. Scalability is another factor of concern when this configuration is used. Reconfiguring the board to support more than 3 cells might not be feasible. Even if feasible, it might require a complex reconfiguration process that would take too much time to be carried out in the field, as a practical matter.

FIG. 1 illustrates the first embodiment of an exemplary platform software architecture. This architecture is generally used on a modem board, but it is to be understood that it may be used in other applications. In this case, a multi-core processor 10 with eight cores (shown as 12, 14, 16, 18, 20, 22, 24, and 26 in the figure) is provided. It is to be appreciated, however, that the multi-core processor 10 may have any number of cores. In this example, a first partition 28 is for the control plane 30 running a first Operating System (OS1) 32. The first partition 28 also includes OA&M 34 and BCS/UPS 36. The BCS/UPS 36 is a middleware layer that provides an abstraction for the hardware to the application software such as the OA&M entity.

Seven AMP partitions (shown as 38, 40, 42, 44, 46, 48, 50 in the figure), one per each of the remaining seven cores, are for the data plane 52 running a second Operating System (OS2) 54.

All of the Layer 2 (L2) processing is done on the eight cores of the processor. The Data Link Layer is Layer 2 of the seven-layer OSI model of computer networking. The Data Link Layer is the protocol layer which transfers data between adjacent network nodes in a wide area network or between nodes on the same local area network segment. The Data Link Layer provides the functional and procedural means to transfer data between network entities and might provide the means to detect and possibly correct errors that may occur in the Physical Layer. Examples of data link protocols are Ethernet for local area networks (multi-node), the Point-to-Point Protocol (PPP), HDLC and ADCCP for point-to-point (dual-node) connections. In our case L2 refers to the L2 scheduler processing needed for the LTE air interface, which has very tight real time requirements.

All of the Layer 1 (L1) processing is done on the DSPs/FPGAs. A core abstraction layer (CAL) 56 hides the core specific details from the L2 application software.

The exemplary architecture also includes a supervisor software entity, such as a hypervisor 58, to ensure that all these partitions run independently and do not corrupt each other (i.e., to ensure fault isolation). A hypervisor is a software program used in virtualization. It allows several operating systems to run side-by-side on a given piece of hardware. Unlike conventional virtual-computing programs, a hypervisor runs directly on the target hardware. This allows both the guest operating systems and the hypervisor to perform much more efficiently. When running, the hypervisor presents all of the operating systems that run on top of it—the "guests"— with a virtualized version of all the system's hardware. This way, the guests cannot access hardware directly, and so any problems caused by one operating system's programs (or even by the OS itself) are isolated from any other OS. A list of possible hypervisors includes, but is not limited to, the following types: Xen (Citrix), KVM (kernel-based virtual machine), VMware ESX/vmkernel, Microsoft Hyper-V, PowerVM (IBM), Logical Domains/Oracle VM, and Wind River Hypervisor.

In this example, the processor 10 serves three cells (shown as 60, 62, and 64 in the figure). Each cell requires an uplink (UL) scheduler (shown as 66, 70, and 74 in the figure) and a downlink (DL) scheduler (shown as 68, 72, and 76 in the figure). Also included is an RLC/MAC block 78, which is the basic transport unit on the air interface that is used between the mobile and the network. It is used to carry data and RLC/MAC signaling.

A configuration using supervised asynchronous multiprocessing, as described above, offers the advantage of a clear separation between the control plane and the data plane. However, it might have limited scalability, and it might be relatively expensive due to hypervisor license fees. Even though it is possible to support a 3-cell configuration with this approach, it may be difficult to support a 6-cell configuration on an 8-core processor with this configuration.

SMP Configuration.

With reference now to FIG. 2, a multi-core processor 100 is shown. This architecture is generally used on a modem board, but it is to be understood that it may be used in other applications. In this embodiment one partition is defined with all 8 cores in it. It is to be appreciated, however, that the multi-core processor 10 may have any number of cores. With this embodiment, it is thus possible to use a single SMP OS instance 102 that runs on all of the cores (e.g., 8 cores). Since the control and data planes are now under one OS instance, care is needed to ensure that a problem with the data plane will not bring down the control plane as well.

In this example, the processor 100 serves three cells (shown as 104, 106, and 108 in the figure). Each cell requires an uplink (UL) scheduler (shown as 110, 112, and 114 in the figure) and a downlink (DL) scheduler (shown as 116, 118, and 120 in the figure). Also included is an RLC/MAC block 122, which is the basic transport unit on the air interface that is used between the mobile and the network. It is used to carry data and RLC/MAC signaling. The processor 100 also provides OA&M 124 and BCS/UPS 126. A core abstraction layer (CAL) 128 hides the core specific details from the L2 application software.

In this configuration there is no need to use a hypervisor, since there is only OS instance running (a potential cost saving). Since the same OS is used for both the control and data planes, maintainability is also less problematic. Software does not need to be developed under different OS for the two planes (i.e., control and data). Another advantage of this configuration is scalability. That is, with this configuration, it is possible to support any configuration from a single cell to up to 6-cell support without the need for any reconfiguration.

To meet the real time performance needs of the base station, an OS such as SMP Linux with PREEMPT_RT patch may be used. Of course, it is to be understood that other operating systems may be used. It should also be noted that proprietary real time OS is more expensive to use. Since Linux is open source, the cost of using an SMP Linux with PREEMPT_RT provided by a tier 1 OS supplier such as Wind River or Montavista is significantly less than using any of their proprietary real time OS. These companies provide extensive testing of the open source Linux code, and they provide patch management. Consequently, going to such companies can alleviate concerns about any indemnification issues related to the open source Linux with PREEMPT_RT patch.

Cell recovery is much more complex in this configuration than in the supervised AMP configuration. In the supervised AMP confirmation, cell recovery, or start-up, could be easily done, by rebooting the cell specific data plane partition. Such a process, however, could not be done in an SMP configuration, as all the control and data planes are now under a single partition. A recovery mechanism must be implemented to ensure that the processes and threads associated with the specific cells are spawned or restarted as part of the cell recovery. Shared resources like buffers, etc. are to be tagged such that as part of the cell recovery the shared resources allocated to the specified cell are released properly.

The SMP configuration may tend to lose the deterministic behavior of the supervised AMP configuration. To achieve deterministic behavior in an SMP configuration, the system is preferably implemented in a manner that employs core reservation and core affinity constructs to achieve AMP-like system behavior. This is also desirable to get the best performance out of SMP Lunix with PREEMPT_RT OS, for example. (PREEMPT_RT OS is still not a hard real-time PS such as VxWorks.) Use of lockless zero copy services, such as buffer management services, may also help address any latency issues that are posed by the use of SMP Linux with PREEMPT_RT OS.

Figure 3:
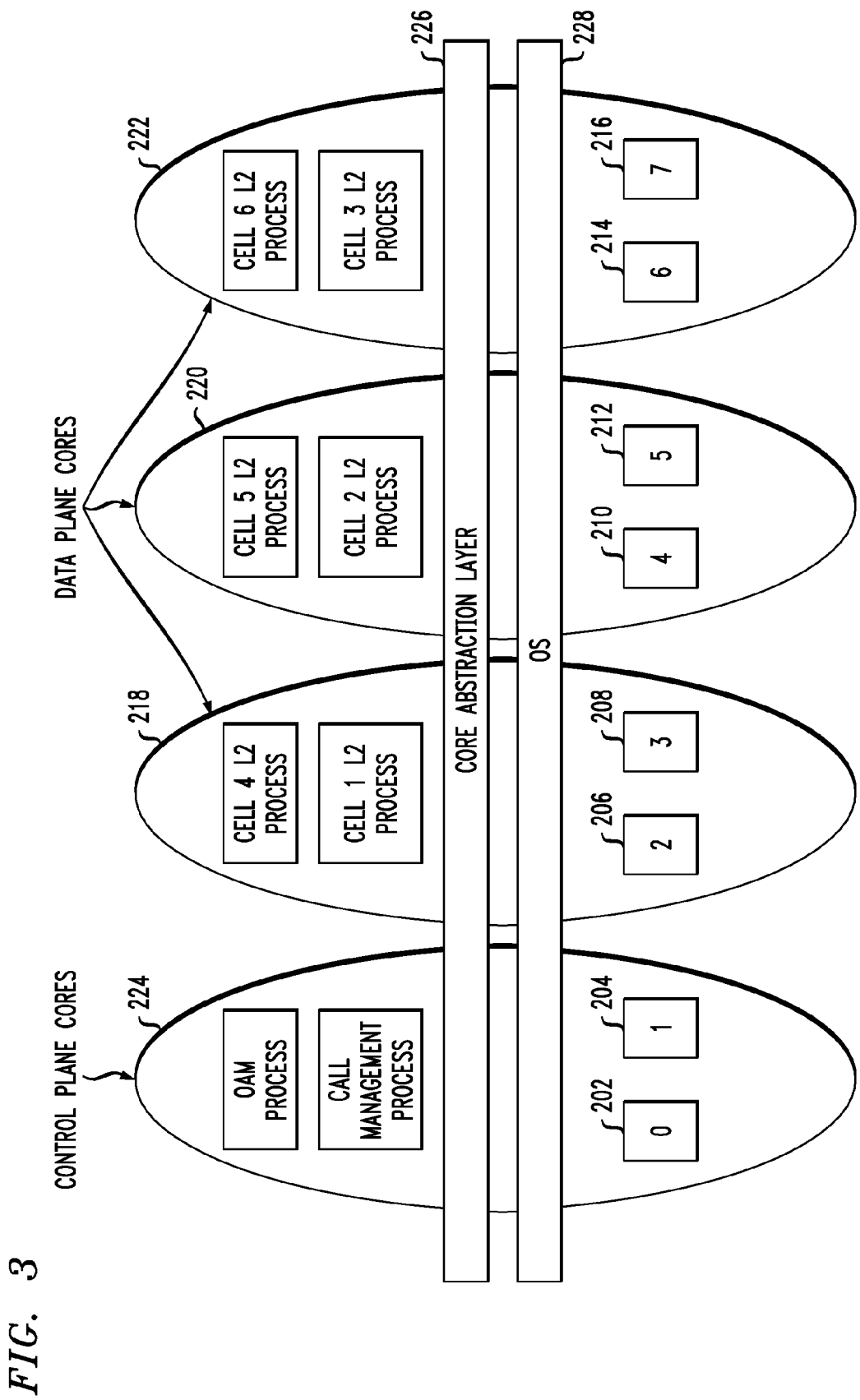
FIG. 3 illustrates an exemplary architecture with core reservation/core affinity in accordance with aspects of the present invention.

FIG. 3 illustrates an architecture that employs core reservation and core affinity construction. In this example, an 8-core processor is used. Cores 0-7 are labeled as reference numerals 202, 204, 206, 208, 210, 212, 214, and 216 in the figure. All non-real-time threads or processes will be bound to cores that are dedicated for the control plane activities. In other words, cores that are dedicated for the data plane activities (labeled as 218, 220, and 222 in the figure) will not host or run any threads that are not directly needed for the fast path (data path) implementation or L2 processing. To achieve core affinity and core reservation, a default affinity mask to control plane core(s) 224 is defined. In this way any thread or process that has not been assigned specific bindings will default to control plane core(s). A core abstraction layer (CAL) 226 hides the core specific details from the L2 application software. In this configuration there is no need to use a hypervisor, since there is only OS instance 228 running.

The real time process/threads corresponding to a given cell are bound via core reservation and core affinity to the specified cores. For example, Cell 1 and Cell 4's UL Scheduler thread is bound to core 2, and DL scheduler thread is bound to core 3.

Thus, FIG. 3 illustrates an AMP-like configuration within the SMP configuration. In this configuration, for example, all control plane process/threads will run on core 0 (202) and core 1 (204). Each of the cell real-time process/threads will run on a dedicated core where no non-real-time process/thread will execute. In this way (1) the non-real time threads will not starve for processing time and (2) the non-real-time thread will not take any valuable processing time from the real-time threads and add to the processing latency spike on the data core that has strict real time processing requirements.

To summarize, an implementation of the present invention uses all of the processor cores in one partition. This will require the use of only one OS instance, and no need to use a hypervisor. Since it may be difficult for simple Linux to meet all of the hard real-time processing needs, an OS such as SMP Linux with PREEMPT_RT patch is preferred. An open source OS is also used to reduce the cost. The system further incorporates core affinity and CPU reservation capabilities of SMP Linux to define an AMP like system behavior within the SMP configuration, which permits 6-cell or even 9-cell configurations.

It is to be appreciated that in connection with the particular exemplary embodiments presented herein certain structural and/or functional features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalent thereof. That is to say, it will be appreciated that various of the above-disclosed and other features and functions, or alternatives thereof, may be desirably combined into many other different systems or applications, and also that various presently unforeseen or unanticipated alternatives, modifications, variations or improvements therein may be subsequently made by those skilled in the art which are similarly intended to be encompassed by the following claims.

We claim:

1. An apparatus for providing multi-cell support in a telecommunications network, the apparatus comprising:
   a modem board; and
   a multi-core processor having a plurality of processor cores attached to the modem board, wherein at least one processor core is used to execute control plane functions and the remaining processor cores are used to execute data plane functions, wherein the multi-core processor is configured to include a core abstraction layer that hides core specific details from application software running on the processor cores.

2. An apparatus for providing multi-cell support in a telecommunications network, the apparatus comprising:
   a modem board; and
   a multi-core processor having a plurality of processor cores attached to the modem board, wherein at least one processor core is used to execute control plane functions and the remaining processor cores are used to execute data plane functions, wherein the multi-core processor is configured to include a supervisor software entity for fault isolation.

3. The apparatus of claim 2, wherein the multi-core processor is configured to serve three cells in the telecommunications network, each cell having a corresponding uplink scheduler and a corresponding downlink scheduler.

4. The apparatus of claim 2, wherein the multi-core processor has eight processor cores.

5. An apparatus for providing multi-cell support in a telecommunications network, the apparatus comprising:
   a modem board; and
   a multi-core processor having a plurality of processor cores attached to the modem board, wherein at least one processor core is used to execute control plane functions and the remaining processor cores are used to execute data plane functions, wherein the first processor core runs a first operating system and the remaining processor cores collectively run a second operating system.

6. An apparatus for providing multi-cell support in a telecommunications network, the apparatus comprising:
   a modem board; and
   a multi-core processor having a plurality of processor cores attached to the modem board, wherein a single partition is defined with the processor cores included in it and wherein the single partition is used to execute control plane functions and data plane functions, wherein the multi-core processor is configured to include a core abstraction layer that hides core specific details from application software running on the processor cores in the single partition.

7. The apparatus of claim 6, wherein the multi-core processor is configured to serve at least three cells in the telecommunications network, each cell having a corresponding uplink scheduler and a corresponding downlink scheduler.

8. The apparatus of claim 6, wherein the multi-core processor has eight processor cores.

9. The apparatus of claim 6, wherein a single operating system instance runs on all of the cores.

10. The apparatus of claim 9, wherein the single operating system instance comprises SMP Linux with PREEMPT_RT.

11. An apparatus for providing multi-cell support with core affinity and core reservation in a telecommunications network, the apparatus comprising:
    a modem board; and
    a multi-core processor having a plurality of processor cores attached to the modem board and configured so that non-real-time threads and processes are bound to processor cores that are dedicated for control plane activities and processor cores that are dedicated for data plane activities will not host or run threads that are not directly needed for data path implementation or Layer 2 processing.

12. The apparatus of claim 11, wherein the multi-core processor is configured to include a default affinity mask to control plane cores.

13. The apparatus of claim 11, wherein the multi-core processor is configured to include a core abstraction layer that hides core specific details from application software running on the processor cores.

14. The apparatus of claim 11, wherein the multi-core processor is configured to serve at least six cells in the telecommunications network.

15. The apparatus of claim 11, wherein the multi-core processor has eight processor cores.

16. The apparatus of claim 15, wherein a single operating system instance runs on all of the cores.

17. The apparatus of claim 11, wherein newly created threads and processes are bound to the cores that are dedicated for control plane activities and do not impede real time data plane threads and processes running on cores that are dedicated for data plane activities.

* * * * *